United States Patent
Rayfield

(10) Patent No.: US 8,590,284 B2
(45) Date of Patent: Nov. 26, 2013

(54) CAM SHIELD FOR A ROTARY REEL

(75) Inventor: James F. Rayfield, New Holland, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/359,099

(22) Filed: Jan. 26, 2012

(65) Prior Publication Data

US 2012/0304611 A1 Dec. 6, 2012

Related U.S. Application Data

(60) Provisional application No. 61/491,458, filed on May 31, 2011.

(51) Int. Cl.
*A01D 57/02* (2006.01)

(52) U.S. Cl.
USPC .......................................................... 56/226

(58) Field of Classification Search
USPC .......... 56/226, 364, 220, 14.4, 221, 219, 222, 56/223, 224, 225, 227, 120, 130
See application file for complete search history.

(56) References Cited

U.S. PATENT DOCUMENTS

| | | | |
|---|---|---|---|
| 3,472,008 A * | 10/1969 | Hurlburt | 56/226 |
| 3,698,166 A * | 10/1972 | Fisher | 56/220 |
| 3,766,725 A * | 10/1973 | Marsh | 56/364 |
| 4,067,177 A * | 1/1978 | Tout | 56/226 |
| 4,068,454 A * | 1/1978 | Webb | 56/220 |
| 4,297,833 A | 11/1981 | Gaeddert | |
| 5,007,235 A * | 4/1991 | Nickel et al. | 56/12.4 |
| 5,052,171 A | 10/1991 | Bich et al. | |
| 5,595,053 A | 1/1997 | Jasper et al. | |
| 5,987,861 A | 11/1999 | Duncan et al. | |
| 6,170,244 B1 * | 1/2001 | Coers et al. | 56/226 |
| 6,502,379 B1 * | 1/2003 | Snider | 56/221 |
| 6,591,598 B2 | 7/2003 | Remillard et al. | |
| 6,843,045 B2 * | 1/2005 | Bickel | 56/14.4 |
| 7,131,253 B2 | 11/2006 | Remillard et al. | |
| 7,665,287 B2 | 2/2010 | Jones | |
| 7,784,256 B2 * | 8/2010 | Rodriguez | 56/327.1 |

* cited by examiner

*Primary Examiner* — Arpád Fábián-Kovács
(74) *Attorney, Agent, or Firm* — Patrick M. Sheldrake; Seyed V. Sharifi T.

(57) ABSTRACT

A cam shield for a rotary reel of a crop harvesting header disposed adjacent to a tine bar of a rotary reel and mounted for movement along a cam in a generally constant angular relationship thereto for deflecting crop material from a cam region forward of a cutter bar and below the cam during rotation of the reel.

19 Claims, 7 Drawing Sheets

CAM SHIELD FOR A ROTARY REEL

This application claims the benefit of U.S. Provisional Patent Application Ser. No. 61/491,458 filed May 31, 2011.

TECHNICAL FIELD

This invention relates generally to a crop harvesting header including a rotary reel and cam arrangement, and more particularly, to a cam shield disposed adjacent to a tine bar and mounted for movement along a cam in a generally constant angular relationship thereto for deflecting crop material from a cam region forward of a cutter bar and below the cam during rotation of the reel.

BACKGROUND ART

U.S. Provisional Application No. 61/491,458, filed May 31, 2011, is incorporated herein in its entirety by reference.

When traveling over a field, crop harvesters typically separate a path of crop material forward of the header to be harvested from crop material to be harvested in a subsequent pass. Forwardly tapered sidewalls of the harvester's frame may be used to separate the crop material, or crop dividers may be mounted to the most forward end of the sidewalls to further facilitate the separation. A rotary reel, including a plurality of tine bars having axially spaced tines therealong, guides the crop material to be harvested towards a cutter bar extending between the sidewalls, and the cut crop is transported on a draper or auger transport arrangement into the harvester for further processing. The tine bars are mounted for pivotal movement about a respective tine bar axis generally parallel to a reel rotational axis. A cam, mounted between the sidewall and an end of the rotary reel, in cooperation with linkages to each tine bar, controls the pivotal movement of the tine bars and thus the angular orientation of the tines thereon. As the rotary reel rotates, the tines on each tine bar follow a predetermined path defined by the cam for lifting, separating, and guiding crop material towards the cutter bar and beyond.

It should be noted that the cutter bar extends between the sidewalls of the header frame below both the rotary reel and the cam and linkage arrangement associated with the end of the rotary reel. In the case of a split rotary reel, a cam and linkage arrangement is associated with an end of each portion of the split rotary reel. As a result, crop material entering the header at a cam region forward of the cutter bar below the cam and linkage arrangement (or between the sidewall and the end of the rotary reel) is not guided by tines towards the cutter bar. It has been observed that this crop material may enter the cam and linkage arrangement and interfere with the operation thereof. In particular, this crop material may affect the movement of rollers along the cam or tangle and cause a blockage near the cam. In addition, this crop material may cause congestion at the cutter bar and/or create blockages thereat.

In order to address this situation, a spring tine has been attached to the cam side of the linkage arrangement. This spring tine is mounted so that it generally follows the path of the tines along the tine bar. While the spring tine is helpful, an area below the cam is still exposed to entering crop material.

Accordingly, what is sought is a cam shield for a rotary reel of a crop harvesting header, which deflects incoming crop material from a cam region, and which provides one or more of the capabilities and overcomes at least one of the problems, shortcomings or disadvantages as set forth above.

SUMMARY OF THE INVENTION

What is disclosed is a cam shield for a rotary reel of a crop harvesting header, which deflects incoming crop material from a cam region, and which provides one or more of the capabilities and overcomes at least one of the problems, shortcomings or disadvantages as set forth above.

According to a preferred embodiment of the invention, a cam shield is mounted for deflecting crop material from a cam region defined below a cam and linkage arrangement disposed for controlling a path followed by tines of a rotary reel of an agricultural harvester. The cam includes a curved forward region disposed in a plane at least generally perpendicular to a rotational axis of the rotary reel. A plurality of tine bars are disposed generally parallel to the rotational axis on the rotary reel, and each of the tine bars is rotatable about a tine bar axis therethrough which is generally parallel to the rotational axis of the reel. The cam shield includes at least two cam followers configured and operable for movement in contact with and along sequential portions of the forward region of the cam, in a manner so as to maintain a generally constant angular relationship to the portion of the cam with which the cam followers are in contact. The cam shield incorporates a linkage arrangement extending between one of the cam followers and one of the tine bars so as to be moved along the sequential portions of the forward region of the cam with the cam followers. The linkage arrangement is configured and operable to change in relation to the followers during the movement so as to rotate the one of the tine bars about the tine bar axis therethrough as a function of a rotational position thereof about the rotational axis of the reel. The cam shield further includes a body portion connected to the cam followers so as to be moved along the sequential portions of the forward region of the cam therewith and so as to be maintained thereby in the generally constant angular relationship to the portion of the cam with which the cam followers are in contact. The body portion is disposed generally forwardly of the forward portion of the cam for deflecting crop material from the cam during the movement therealong.

According to a preferred aspect of the invention, the at least two cam followers include a leading cam follower and a trailing cam follower. As the cam followers move along sequential portions of the forward region of the cam, the leading cam follower is situated forward of the trailing cam follower, and the linkage arrangement extends between the leading cam follower and the one of the tine bars.

According to another preferred aspect of the invention, the leading cam follower cooperates with the linkage arrangement and the cam to produce pivotal movement of the tine bar about the tine bar axis. As a result, angular positions of the tines about the tine bar axis are controlled as a function of the position of the tine bar about the rotational axis of the reel. However, cooperation between both cam followers and the cam maintain the cam shield in constant angular relation to the cam independent of the rotational position thereof about the rotational axis of the reel.

According to a preferred feature of the invention, the cam shield includes an axially tapered edge disposed such that the cam shield engages crop material with an increasing axial extent during rotation of the reel.

According to another preferred feature of the invention, the body portion of the cam shield follows a path around a perimeter of the cam in constant angular relation with the cam as the reel is rotated.

According to yet another preferred feature of the invention, the body portion of the cam shield is disposed radially outwardly of the cam and extends axially from an endmost tine thereto.

As an attendant advantage of the invention, the body portion of the cam shield defects crop material from a cam region defined below the cam and linkage arrangement.

DETAILED DESCRIPTION OF THE INVENTION

Figure 1:
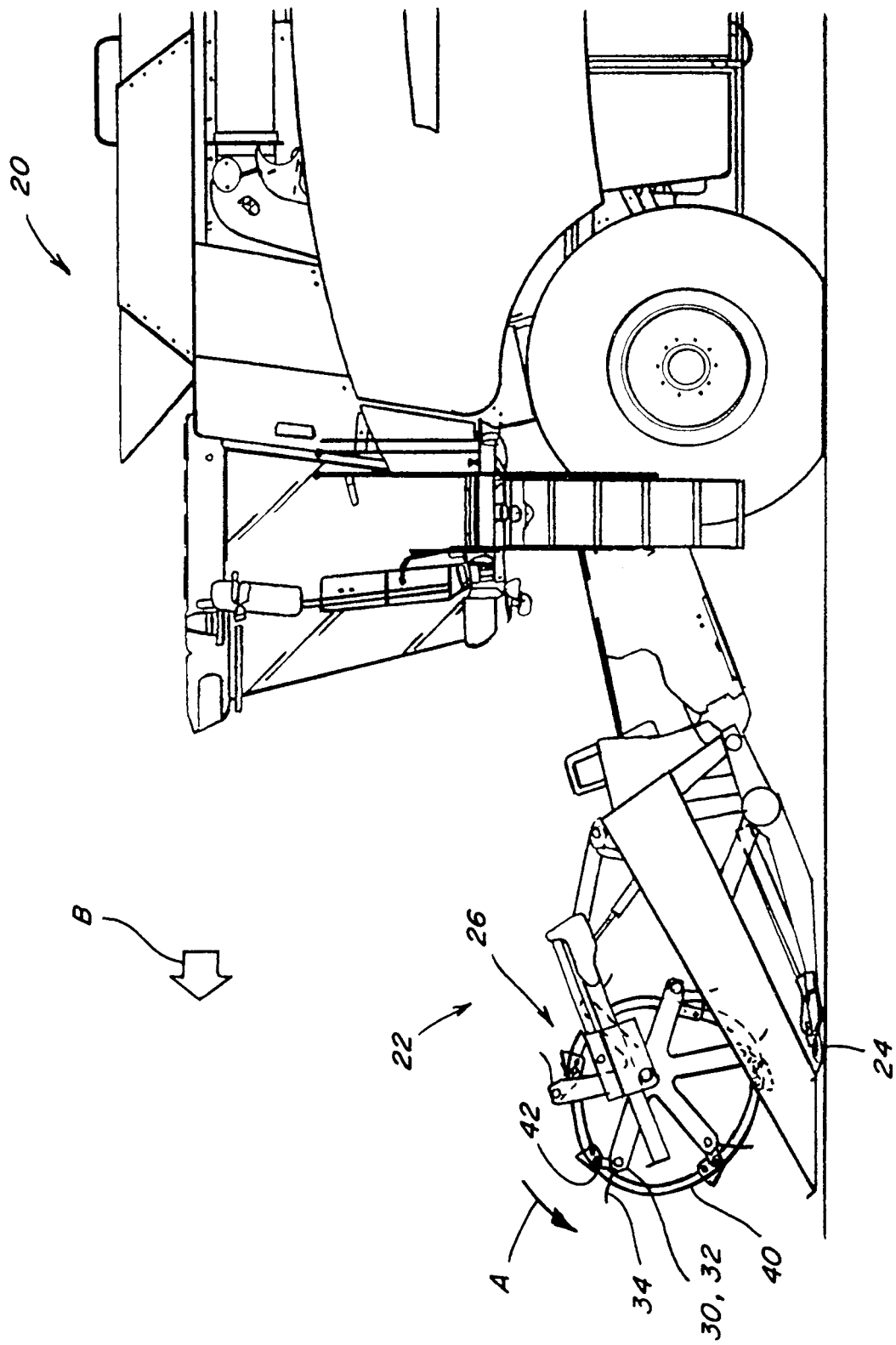
FIG. 1 is a partial side view of an agricultural cutting machine, which is a combine, including a header equipped with the present invention.
Figure 2:
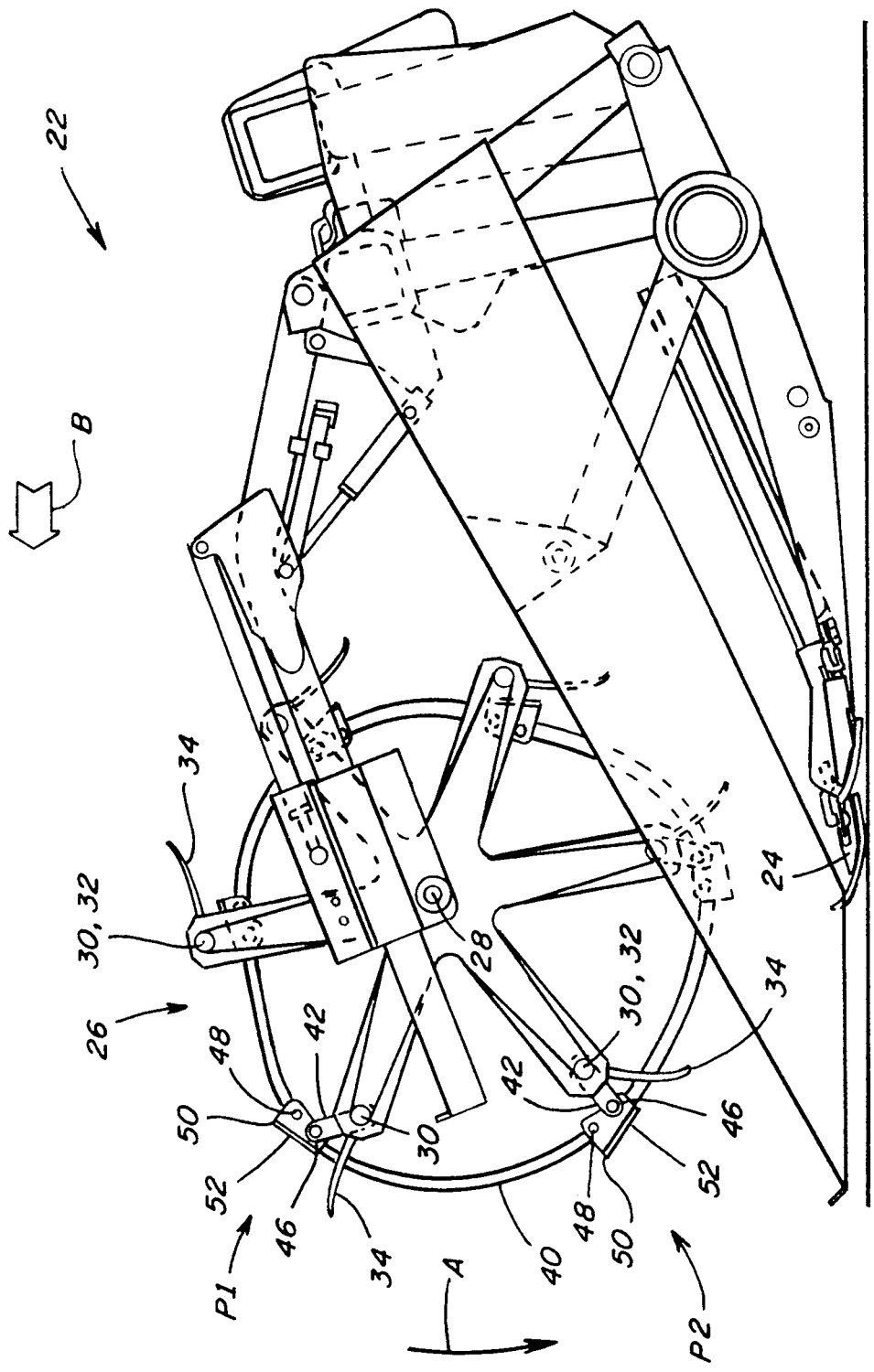
FIG. 2 is an enlarged fragmentary side view of the header and reel according to the invention.
Figure 3:
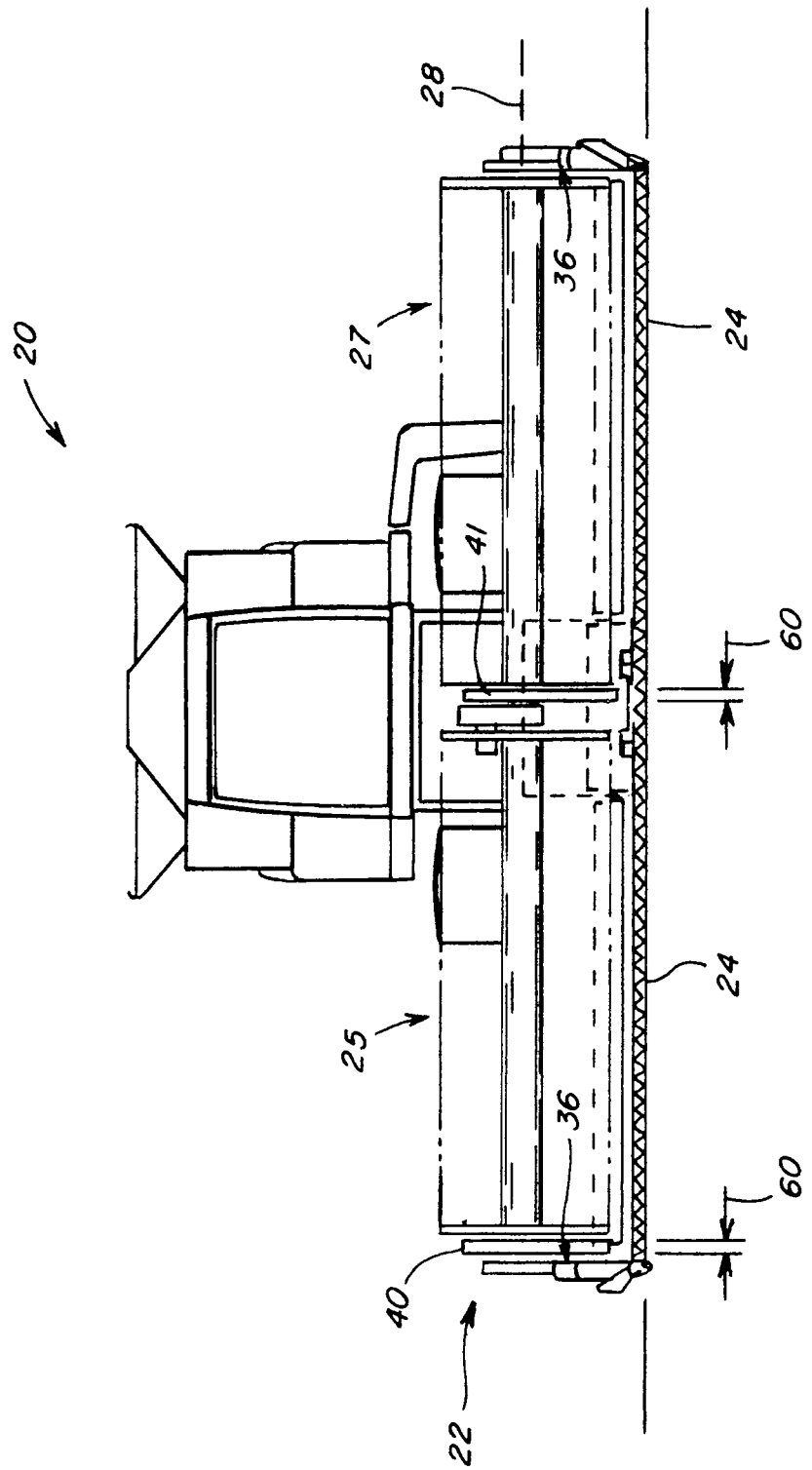
FIG. 3 is a front view of the harvester and header, showing cam and reel locations.
Figure 5:
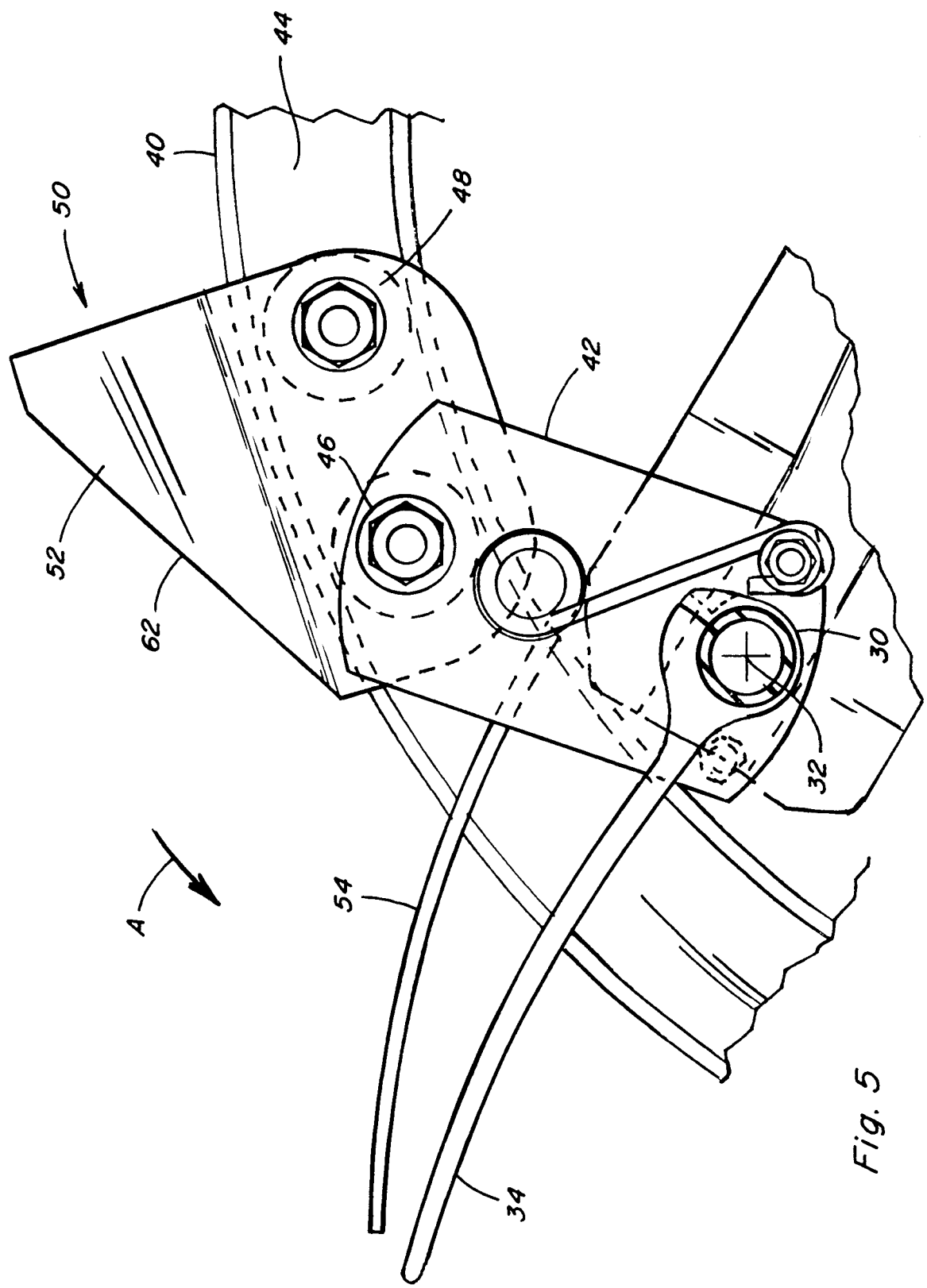
FIG. 5 is an enlarged fragmentary side view of one tine bar of the reel shown with a portion of a cam and a linkage arrangement extending to the tine bar equipped with the invention.
Figure 6:
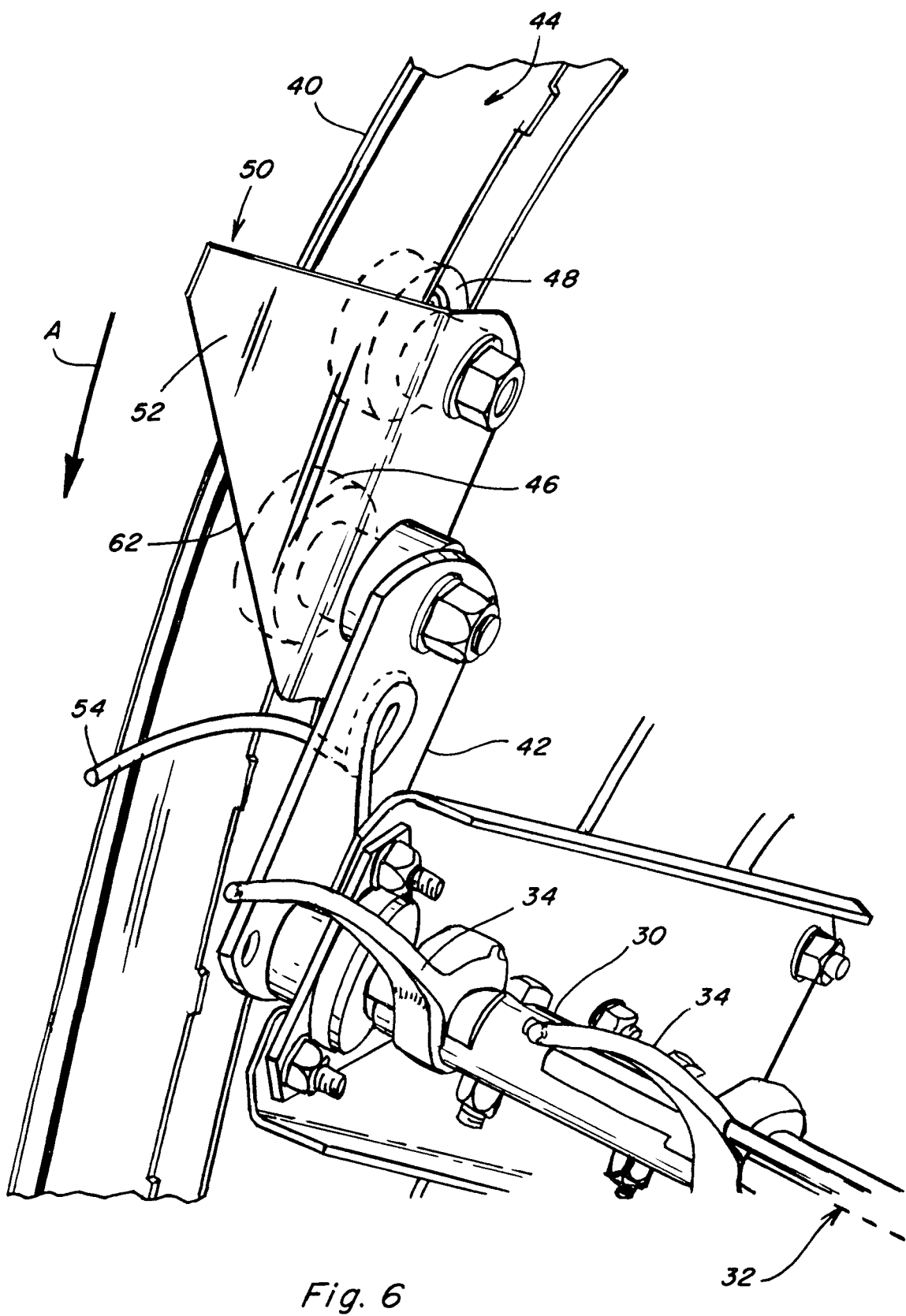
FIG. 6 is an enlarged perspective view of one of the tine bars of the reel shown with a portion of the cam and the linkage arrangement including the present invention.
Figure 7:
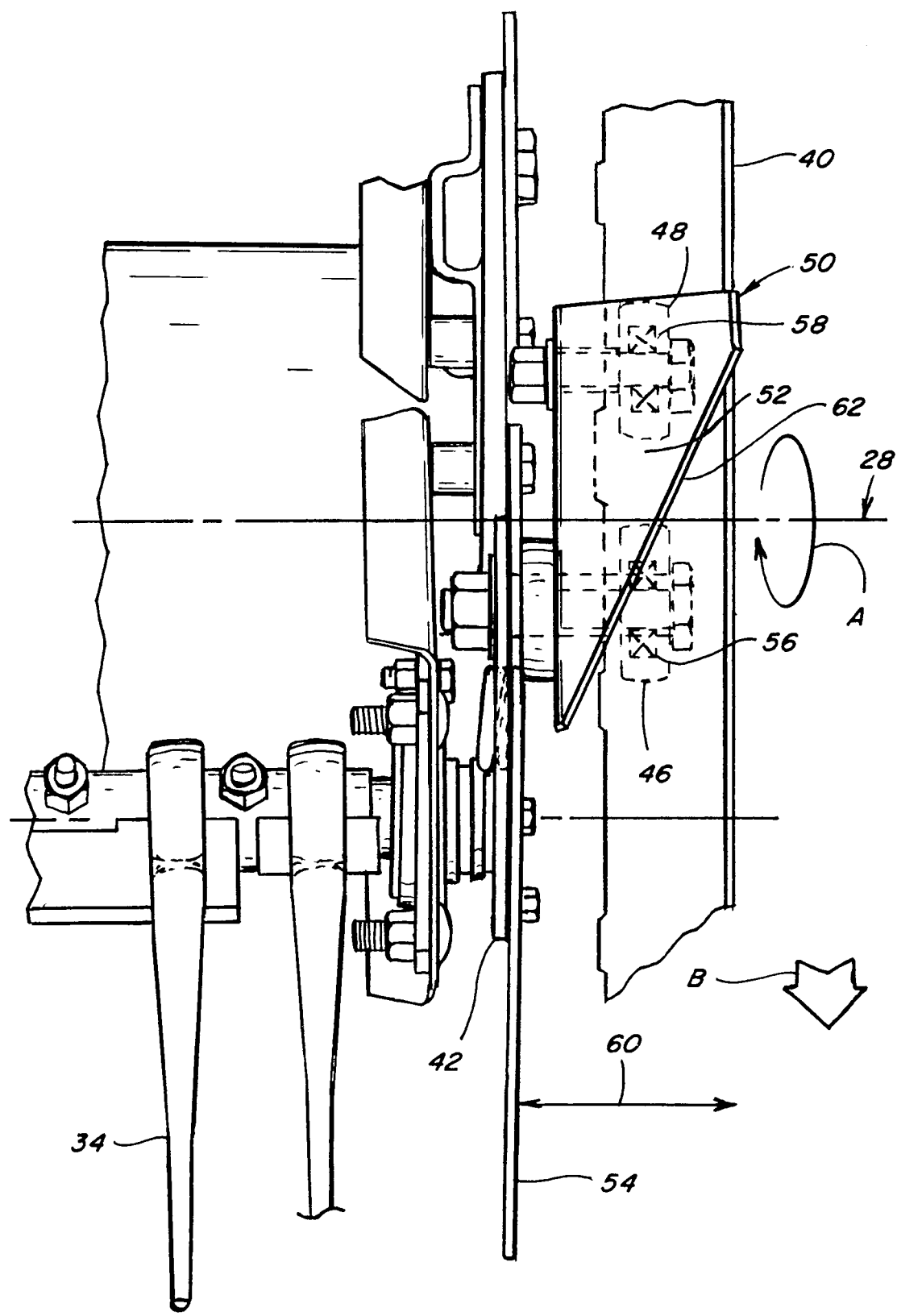
FIG. 7 is an enlarged partial top view of one of the tine bars of the reel shown with the present invention.

Turning now to the drawings wherein FIGS. 1-3 show the forward portion of an agricultural cutting machine, which is a combine 20, including a draper type header 22 having an elongate, sidewardly extending cutter bar 24 situated below an elongate, sidewardly extending rotary reel 26 supported by structure in desired proximity to the surface of the field during the harvesting operation. To facilitate plant movement toward cutter bar 24, reel 26 is rotatable about a reel axis 28 and includes a plurality of tine bars 30 having axially spaced tines 34 projecting therefrom. Each tine bar 30 is mounted for pivotal movement about a tine bar axis 32 therethrough generally parallel to reel axis 28. Pivotal movement of each of the tine bars 30 is controlled by a cam 40 disposed in a plane at least generally perpendicular to reel axis 28 and a linkage arrangement 42 between cam 40 and tine bars 30. Cam followers are received in and follow along a cam path 44 defined by cam 40, and linkage arrangement 42 extends between the cam followers and tine bars 30 allowing pivotal movement of tine bars 30 around tine bar axis 32. Often a spring tine 54 is disposed on the cam side of linkage arrangement 42 as seen in FIGS. 5 through 7. Spring tine 54 is situated closer to cam 40 than an endmost tine of tine bar 30, and follows the pivotal movement of tines 34. In many instances, portions of cam 40 may be located at different radial distances from reel axis 28 for controlling pivotal movement of tine bars 30.

Thus, during rotation of reel 26 in the direction denoted by arrow A, tine bars 30 pivot around tine bar axis 32 so that tines 34 follow a predetermined path for lifting, separating, and/or urging plant material towards cutter bar 24. The severed plant material is conveyed on a system of draper belts toward an inlet opening of a feeder for conveyance into combine 20 for threshing and cleaning, in the well known manner, as combine 20 moves forwardly over a field in a direction denoted by arrow B. Although illustrated with a draper type header, the present invention is suitable for a header using alternate conveyance systems, such as, but not limited to, an auger. In addition, the present invention is suitable for use with a windrowing type machine wherein the severed plant material is discharged from the rear of the machine.

According to the present invention, a cam shield 50 for an agricultural crop cutting header, such as combine 20, is shown in FIGS. 1 through 7. At least two cam followers 46 and 48 are configured and operable for movement in contact therewith and along sequential portions of cam path 44 of cam 40 while maintaining a generally constant angular relationship to the portion of cam 40 with which cam followers 46 and 48 are in contact. As most easily seen in FIGS. 2 and 5 through 7, linkage arrangement 42 extends between cam follower 46 and one tine bar 30 so as to be moved along sequential portions of cam 40 therewith. Linkage arrangement 42 is configured and operable to change in relation to cam followers 46 and 48 during movement therewith so as to rotate tine bar 30 about tine bar axis 32 therethrough as a function of a rotational position thereof about rotational axis 28 of reel 26. The change in relation between cam 40, including cam followers 46 and 48, and linkage arrangement 42 can be seen with reference to two rotational positions P1 and P2 identified in FIG. 2. At P1, linkage arrangement 42 is leading cam followers 46 and 48 forming an acute angle with the portion of cam 40 with which cam followers 46 and 48 are in contact. As a result, tine bar 30 is pivoted such that tines 34 thereon extend outwardly as shown. In contrast, at rotational position P2, linkage arrangement 42 has moved to a position normal to the portion of cam 40 with which cam followers 46 and 48 are in contact. As a result, tine bar 30 is pivoted such that tines 34 thereon extend at a downward angle in position to contact crop material as shown.

Cam shield 50 further includes a body portion 52 connected to cam followers 46 and 48 so as to be moved along the sequential portions of cam 40 therewith and so as to be maintained thereby in the generally constant angular relationship to the portion of cam 40 with which cam followers 46 and 48 are in contact. Referring again to FIG. 2, body portion 52 of cam shield 50 is in the same angular position relative to cam followers 46 and 48 in both rotational positions P1 and P2. Body portion 52 is disposed generally forwardly or radially outwardly of cam 40 for deflecting crop material from cam 40 during the movement therealong.

Figure 4:
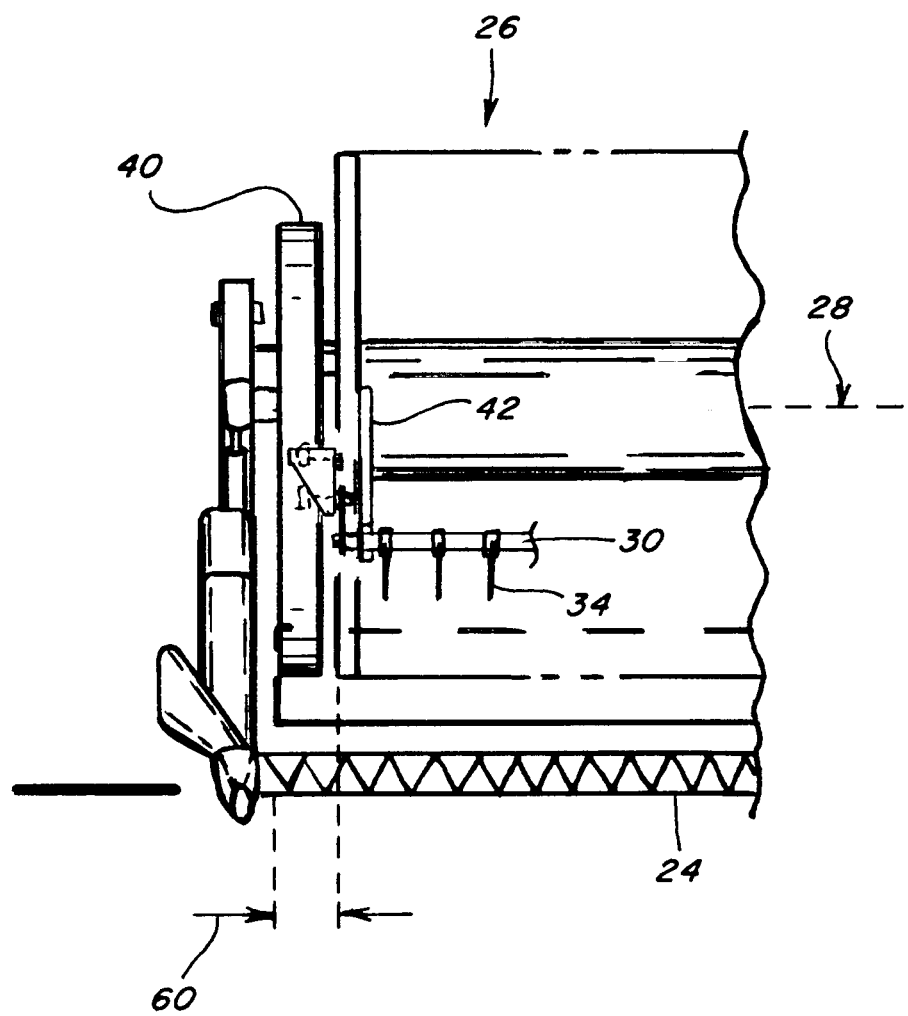
FIG. 4 is an enlarged fragmentary front view of a side of the header.

An attendant advantage of the invention may be illustrated with reference to a front view of combine 20 and header 22 as seen in FIGS. 3 and 4. Cutter bar 24 extends between sidewalls 36 of header 22 along the same extent as reel 26 and cam 40 and linkage arrangement 42. As a result crop material that enters header 22 in a cam region 60 forward of cutter bar 24 and below cam 40 and linkage arrangement 42 is not guided by tines 34 of reel 26. Even when spring tine 54 is present, cam region 60, between spring tine 54 and cam 40, still exists. Therefore, cam 40, cam followers 46 and 48, and linkage arrangement 42 are directly exposed to crop material entering header 22 at cam region 60. This crop material may enter cam path 44 and/or it may become tangled at linkage arrangement 42 and bearings 56 and 58 of cam followers 46 and 46, respectively, adversely affecting movement of tine bars 30 and tines 34 thereon. This may result in excessive wear, heat, possible damage to header 22, congestion or blockages at cam 40 or cutter bar 24, and crop and/or time loss. In the case of a split rotary reel including reel portions 25 and 27 as seen in FIG. 3, a second cam 41 and linkage arrangement (not shown) is associated with an end of reel portion 27 of the split rotary reel creating a second cam region 60. Cam shield 50 deflects crop material entering header 22 at cam region 60, thereby reducing the likelihood of adversely affecting movement of tine bars 30 and tine 34.

According to a preferred aspect of the invention, and depicted in FIGS. 5 through 7, the cam followers include a leading cam follower denoted 46 and a trailing cam follower denoted 48 such that, as cam followers 46 and 48 move along sequential portions of cam 40, leading cam follower 46 is situated forward of trailing cam follower 48, and linkage arrangement 42 extends between leading cam follower 46 and one of the tine bars 30.

According to another preferred aspect of the invention, leading cam follower 46 cooperates with linkage arrangement 42 and cam 40 to produce pivotal movement of tine bar 30 about tine bar axis 32 thereby controlling an angular position of tines 34 about tine bar axis 32 as a function of the rotational position thereof about the rotational axis 28 of reel 26. In contrast, cam followers 46 and 48 cooperate with cam 40 for maintaining cam shield 50 in constant angular relation to cam 40 independent of the rotational position thereof about rotational axis 28 of reel 26.

According to a preferred feature of the invention, body portion 52 of cam shield 50 includes an axially tapered edge disposed such that cam shield 50 engages crop material with an increasing axial extent during rotation of reel 26 in the direction denoted by arrow A.

According to another preferred feature of the invention, body portion 52 of cam shield 50 follows a path around a perimeter of cam 40 in constant angular relation with cam 40 as reel 26 is rotated.

According to yet another preferred feature of the invention, body portion 52 of cam shield 40 is disposed radially outwardly of cam 40 and extends axially from an endmost tine thereto.

According to yet another preferred feature of the invention, cam shield 50 is disposed radially outwardly of cam 40 and extends axially from linkage arrangement 42 thereto for deflecting crop material from cam region 60 between linkage arrangement 42 and cam 40 while following therealong.

In light of all the foregoing, it should thus be apparent to those skilled in the art that there has been shown and described a cam shield for a rotary reel of a crop harvesting header. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A cam shield for an agricultural crop cutting header including a cam having a curved forward region disposed in a plane at least generally perpendicular to a rotational axis of a rotary reel including a plurality of tine bars generally parallel to the rotational axis, each of the tine bars being rotatable about a tine bar axis therethrough generally parallel to the rotational axis of the reel, the cam shield comprising:

at least two cam followers configured and operable for movement in contact with and along sequential portions of the forward region of the cam, in a manner so as to maintain a generally constant angular relationship to the portion of the cam with which the cam followers are in contact;

a linkage arrangement extending between one of the cam followers and one of the tine bars so as to be moved along the sequential portions of the forward region of the cam therewith, the linkage arrangement being configured and operable to change in relation to the followers during movement therewith so as to rotate the one of the tine bars about the tine bar axis therethrough as a function of a rotational position thereof about the rotational axis of the reel; and a body portion connected to the cam followers so as to be moved along the sequential portions of the forward region of the cam therewith and so as to be maintained thereby in the generally constant angular relationship to the portion of the cam with which the cam followers are in contact, the body portion being disposed generally forwardly of the forward portion of the cam for deflecting crop material from the cam during the movement therealong.

2. The cam shield of claim 1 wherein the at least two cam followers comprises a leading cam follower and a trailing cam follower such that, as the cam followers move along sequential portions of the forward region of the cam, the leading cam follower is situated forward of the trailing cam follower, and the linkage arrangement extends between the leading cam follower and the one of the tine bars.

3. The cam shield of claim 2 wherein the leading cam follower cooperates with the linkage arrangement and the cam to produce pivotal movement of the tine bar about the tine bar axis thereby controlling an angular position of the tines about the tine bar axis as a function of the rotational position thereof about the rotational axis of the reel and the at least two cam followers cooperate with the cam for maintaining the cam shield in constant angular relation to the cam independent of the rotational position thereof about the rotational axis of the reel.

4. The cam shield of claim 1 wherein the cam shield includes an axially tapered edge disposed such that the cam shield engages crop material, with an increasing axial extent during rotation of the reel.

5. The cam shield of claim 1 wherein the body portion of the cam shield follows a path around a perimeter of the cam in constant angular relation with the cam as the reel is rotated.

6. The cam shield of claim 1 wherein the body portion of the cam shield is disposed radially outwardly of the cam and extends axially from an endmost tine thereto.

7. The cam shield of claim 1 wherein the body portion of the cam shield defects crop material from a cam region defined forward of the cutter bar and below the cam and the linkage arrangement.

8. A cam shield for an agricultural crop cutting header including a cam defining an eccentric path disposed about and in a plane at least generally perpendicular to a rotational axis of a rotary reel including a plurality of tine bars generally parallel to the rotational axis, each of the tine bars including a row of axially spaced tines therealong and being rotatable about a tine bar axis therethrough generally parallel to the rotational axis of the reel, the cam shield comprising:

at least two cam followers configured and operable for engaging and following the cam, in a manner so as to maintain a generally constant angular relationship to a portion of the cam with which the cam followers are engaged, a linkage arrangement extending between one of the cam followers and one of the tine bars, the linkage arrangement being configured and operable for moving the one of the tine bars so as to follow the cam and to allow rotation of the one of the tine bars about the tine bar axis therethrough as a function of a rotational position thereof about the rotational axis of the reel, and a body portion connected to the cam followers so as to follow the cam and to maintain a generally constant angular relationship to the portion of the cam with which the cam followers are engaged, the body portion being disposed generally radially outwardly of the cam extending axially from the linkage arrangement thereto for deflecting crop material from a cam region between the linkage arrangement and the cam while following therealong.

9. The cam shield of claim 8 wherein the at least two cam followers comprises a leading cam follower and a trailing cam follower such that, as the cam followers follow along the cam, the leading cam follower is situated forward of the trailing cam follower, and the linkage arrangement extends between the leading cam follower and the one of the tine bars.

10. The cam shield of claim 9 wherein the leading cam follower cooperates with the linkage arrangement and the cam to produce pivotal movement of the tine bar about the tine bar axis thereby controlling an angular position of the tines about the tine bar axis as a function of the rotational position thereof about the rotational axis of the reel and the at least two cam followers cooperate with the cam for maintaining the cam shield in constant angular relation to the cam and the rotational axis independent of the rotational position thereof about the rotational axis of the reel.

11. The cam shield of claim 8 wherein the cam shield includes an axially tapered edge disposed such that the cam shield engages crop material with an increasing axial extent during rotation of the reel.

12. The cam shield of claim 8 wherein the body portion of the cam shield follows a path around a perimeter of the cam in constant angular relation with the cam as the reel is rotated.

13. A cam shield for an agricultural crop cutting header including a cam disposed in a plane at least generally perpendicular to a rotational axis of a rotary reel including a plurality of tine bars generally parallel to the rotational axis, each of the tine bars including a row of axially spaced tines therealong and being rotatable about a tine bar axis therethrough generally parallel to the rotational axis of the reel, the cam shield comprising:
at least two cam followers configured and operable for movement along the cam in a generally constant angular relationship to the cam,
a linkage arrangement extending between one of the cam followers and one of the tine bars so as to be moved along the cam therewith, the linkage arrangement being configured and operable to change in angular relationship to the one of the cam followers for allowing rotation of the one of the tine bars about the tine bar axis therethrough for controlling angular positions of the tines therealong as a function of a rotational position thereof about the rotational axis of the reel, and
a body portion connected to the cam followers for movement along the cam therewith in the generally constant angular relationship to the cam, the body portion being disposed generally radially outwardly of the cam for deflecting crop material from the cam during the movement therealong.

14. The cam shield of claim 13 wherein the at least two cam followers comprises a leading cam follower and a trailing cam follower such that, as the cam followers move along the cam, the leading cam follower is situated forward of the trailing cam follower, and the linkage arrangement extends between the leading cam follower and the one of the tine bars.

15. The cam shield of claim 14 wherein the leading cam follower cooperates with the linkage and the cam to produce pivotal movement of the tine bar about the tine bar axis thereby controlling an angular position of the tines about the tine bar axis as a function of the rotational position thereof about the rotational axis of the reel and the at least two cam followers cooperate with the cam for maintaining the cam shield in constant angular relation to the cam and the rotational axis independent of the rotational position thereof about the rotational axis of the reel.

16. The cam shield of claim 13 wherein the cam shield includes an axially tapered edge disposed such that the cam shield engages crop material with an increasing axial extent during rotation of the reel.

17. The cam shield of claim 13 wherein the body portion of the cam shield follows a path around a perimeter of the cam in constant angular relation with the cam as the reel is rotated.

18. The cam shield of claim 13 wherein the body portion of the cam shield is disposed radially outwardly of the cam and extends axially from an endmost tine thereto.

19. The cam shield of claim 13 wherein the body portion of the cam shield defects crop material from a cam region between the linkage arrangement and the cam.

\* \* \* \* \*